(12) United States Patent
Dietz et al.

(10) Patent No.: US 6,458,178 B1
(45) Date of Patent: Oct. 1, 2002

(54) FILTER DEDUSTING ARRANGEMENT IN A VACUUM CLEANER

(75) Inventors: Klaus Dietz, Ulm; Silke Meyer, Neu-Ulm; Günther Werbach, Weissenhorn-Oberhausen, all of (DE)

(73) Assignee: WAP Reinigungssysteme GmbH & Co., Bellenberg (DE)

( * ) Notice: Subject to any disclaimer, the term of this patent is extended or adjusted under 35 U.S.C. 154(b) by 0 days.

(21) Appl. No.: 09/685,257

(22) Filed: Oct. 10, 2000

(30) Foreign Application Priority Data

Oct. 12, 1999 (DE) .......................... 199 49 095

(51) Int. Cl.[7] .............................. B01D 46/04
(52) U.S. Cl. ................... 55/302; 55/283; 55/284; 55/287; 55/385.1; 55/467; 95/20; 95/279
(58) Field of Search ............... 55/283, 284, 286, 55/287, 302, 303, 310, 313, 385.1, 422, 467, DIG. 3, DIG. 8; 96/400, 403, 372; 95/19, 20, 22, 279, 280

(56) References Cited

U.S. PATENT DOCUMENTS

| | | | | |
|---|---|---|---|---|
| 2,954,873 A | * | 10/1960 | Davis | 55/302 |
| 3,178,868 A | * | 4/1965 | Gibby | 55/302 |
| 3,589,520 A | * | 6/1971 | Thorne | 55/303 |
| 3,748,836 A | * | 7/1973 | Bachle | 55/302 |
| 4,046,526 A | * | 9/1977 | Phillippi | 55/302 |
| 4,190,230 A | * | 2/1980 | Geissbühler | 55/302 |
| 4,945,722 A | * | 8/1990 | Goerlich | 55/313 |
| 5,566,545 A | * | 10/1996 | Hijikata et al. | 55/302 |
| 5,788,746 A | * | 8/1998 | Bartling | 55/283 |
| 5,837,017 A | * | 11/1998 | Santschi et al. | 55/302 |

FOREIGN PATENT DOCUMENTS

| | | |
|---|---|---|
| DE | 12 45 550 | 2/1968 |
| DE | 21 06 058 | 9/1971 |
| DE | 41 38 223 | 2/1993 |

* cited by examiner

Primary Examiner—Duane Smith
Assistant Examiner—Jason M. Greene

(57) ABSTRACT

The invention relates to a filter dedusting arrangement in a vacuum cleaner, wherein dedusting of the filter or filter-parts is effected by supplying a secondary airflow, in a known manner. The distinctive feature of the invention is that the secondary airflow through the filter for dedusting is controlled so that by utilizing differences in pressure a flap element arranged in a casing abruptly changes its position and opens and/or closes one or more openings in the casing so that the secondary airflow impinges impulsively on the surface of the filter to be dedusted. The impulsive supply of secondary air to the filter produces a much better cleaning action.

16 Claims, 2 Drawing Sheets

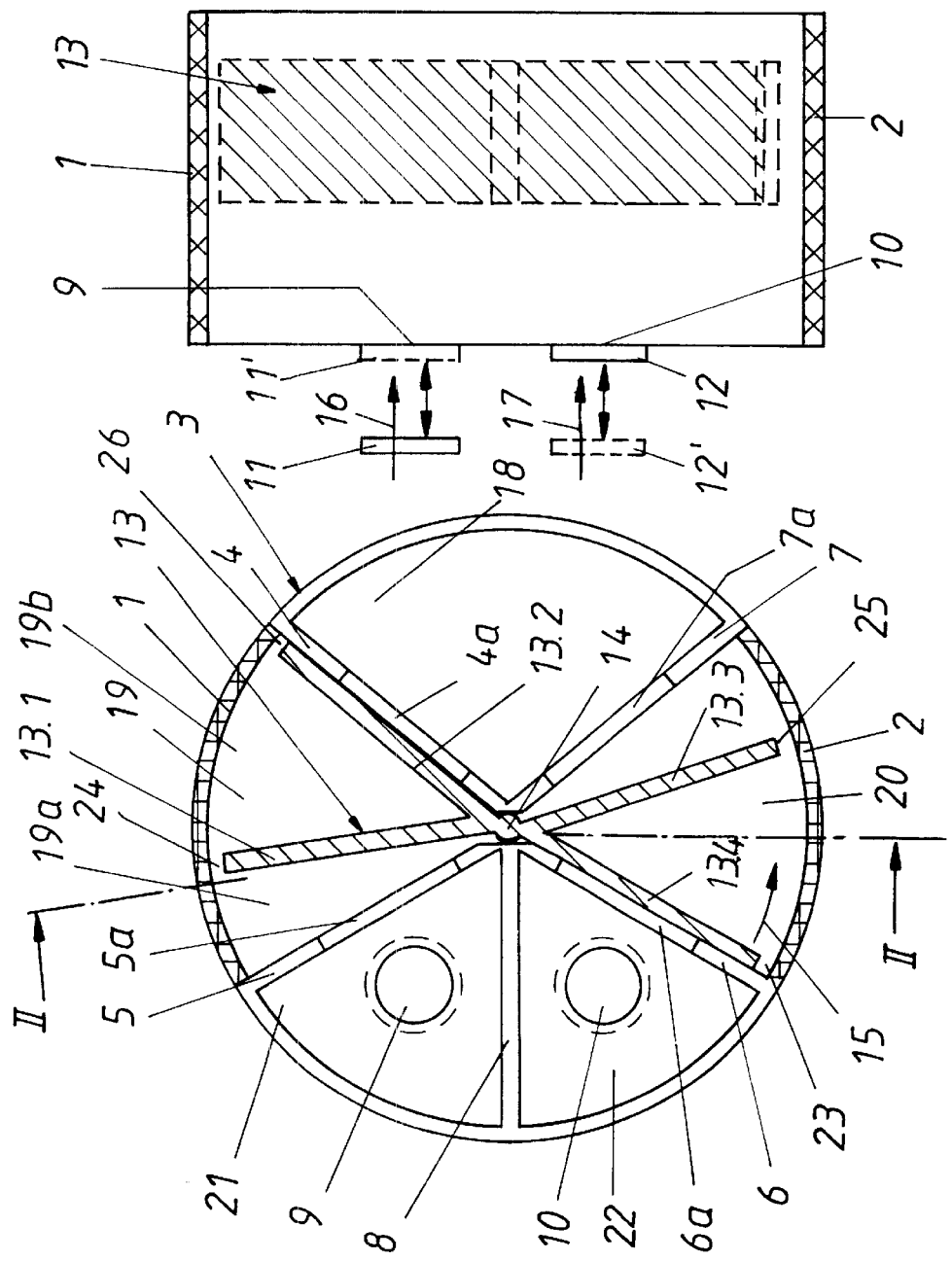

FILTER DEDUSTING ARRANGEMENT IN A VACUUM CLEANER

BACKGROUND OF THE INVENTION

1. Field of the Invention

The invention relates to a filter dedusting arrangement in a vacuum cleaner.

2. Description of the Related Art

Such a filter dedusting arrangement is known for example from the subject-matter of DE 4138223 C1. The disclosure content of that publication is deemed to be embraced by the present invention.

In the cited publication, the change-over from the suction airflow to the extraneous airflow is made by an air supply duct which is translatable by means of a driving rod to optionally register with one or other of the two openings of the filter and put it in communication with the extraneous airflow, with an airtight connection.

Such an arrangement, however, has the drawback that the filter is not dedusted impulsively, but is merely dedusted by a steady inflow of extraneous air. Abrupt dedusting of the filter does not occur. Yet it has been found that an improved filter cleaning action can be obtained by impulsive, abrupt dedusting.

Therefore the fundamental problem of the invention is to develop a filter dedusting arrangement of the kind stated at the outset so as to produce a much better cleaning action.

BRIEF SUMMARY OF THE INVENTION

The distinctive feature of the invention is that the secondary or extraneous airflow through the filter for dedusting is controlled so that by utilizing differences in pressure a flap element arranged in a casing abruptly changes its position and opens and/or closes one or more openings in the casing so that the secondary airflow impinges impulsively on the surface of the filter to be dedusted.

To that end, use is made of the pressure differences between the partial vacuum of the suction airflow and atmospheric pressure and/or a separately generated positive pressure.

The mechanism as a whole comprises a known filter made in at least two parts or two separate part-filters and a casing divided by partitions into several, preferably five, chambers.

When dedusting is initiated, secondary air in the form of ambient air or air under pressure is supplied via one or more valve devices to one chamber and to parts of the flap element. The latter is formed as a rotary vane, and is abruptly set in motion and pivoted from a first end position into a second end position where it closes a corresponding outlet-opening so that the secondary air admitted into this chamber impinges on the associated filter or filter-part (reverse side of filter) and supplies the filter with an airflow impulsively formed by the abrupt changeover of the flap element. In this way, the airflow impulsively directed on to the back of the filter is used to dislodge and blast away the dust particles present in the filter, thus producing an excellent cleaning action.

The flap element is preferably connected to other vane parts so that not only is it used to admit secondary air and thus to initiate the dedusting of the filter, but also other parts of the flap element serve to switch the suction airflow from the filter surface which is about to be dedusted to another, freshly dedusted, filter surface.

Thus the flap element has a dual function, viz.: first, that of abruptly or impulsively directing secondary air on to one filter surface with the aim of dedusting that filter surface, and second, that of directing suction air on to another, e.g. opposing, filter surface, which then performs the filtering function for which it is intended.

The two filter surfaces are interchangeable. On an alternating basis, one filter surface can be dedusted while the filter surface that is not undergoing dedusting serves as the filter surface proper, retaining the dust particles contained in the suction airflow.

This alternation of the opposing filter surfaces depends on when the flap element changes over.

The flap element is changed over by the admission of extraneous air through one of a number of inlet connections on the filter casing, by valve shutters shifted into their closed or open position by electric motor or electromagnet, or manually.

The changeover to dedust the filter surface by directing the extraneous airflow on to it can be electronically controlled by means of suitable sensors. In this case, the sensors detect e.g. the amount of soiling of the filter surfaces, and initiate dedusting of the soiled surfaces. Provision can of course be made for the dedusting operation to be initiated manually at any time.

What matters is that the flap element operates passively: that is to say, it does not have to be separately driven, but is simply pivoted into one or the other position by the difference in pressure between the suction airflow and the dedusting airflow in the vacuum cleaner.

In one possible embodiment, instead of using normal atmospheric air pressure alone for the dedusting airflow, a pulse of air under pressure is additionally introduced into this airflow; or, instead of the dedusting airflow from the atmosphere alone, a pulse of air under pressure is delivered to the filter surface for dedusting purposes.

The shape of the filter casing need not necessarily be cylindrical. Other filter geometries are also possible. For example, the filter may be rectangular, square or triangular, but it must be defined by the partitions which will be described presently and by the openings in the partitions.

Of course, be flap element must be adapted to the geometry of the filter casing.

Again, the filter surfaces need not necessarily be part of the filter casing. They may be connected to the filter casing by corresponding passageways and as a result may be made considerably larger, and with a larger surface area, compared to these which are described here in the embodiments.

The filter may for example be made relatively elongated in form, and the rotary vane for controlling the secondary air to be impulsively introduced may be arranged in the upper region of the filter, while the whole of the lower region of the filter is formed by corresponding filter surfaces.

Alternatively, one or more flat filters, impinged on by secondary air or suction air depending on the position of the flap element, may be used.

From this it follows that the switching part with the flap element can be spatially separate, or connected to a filter by its casing, the filter geometry being of secondary importance as previously stated.

In the illustrated embodiments, the filter casing itself comprises the filter surfaces involved in dedusting. This is shown only by way of example, and is not a necessary element of the solution.

All details and features disclosed in the documents, including the abstract, and in particular the configurative form shown in the drawings, are claimed as essential to the invention insofar as, taken separately or in combination, they are novel in relation to the state of the art.

BRIEF DESCRIPTION OF THE SEVERAL VIEWS OF THE DRAWINGS

The invention will now be described in detail with reference to drawings illustrating just one way of carrying out the invention. Further essential features and advantages of the invention will become apparent from the drawings and their description.

In the drawings:

FIG. 1 is a schematically drawn top view of a filter casing with changeover device FIG. 2 shows schematically a section on the line 2/2 in FIG. 1

DETAILED DESCRIPTION OF THE INVENTION

Figure 4:
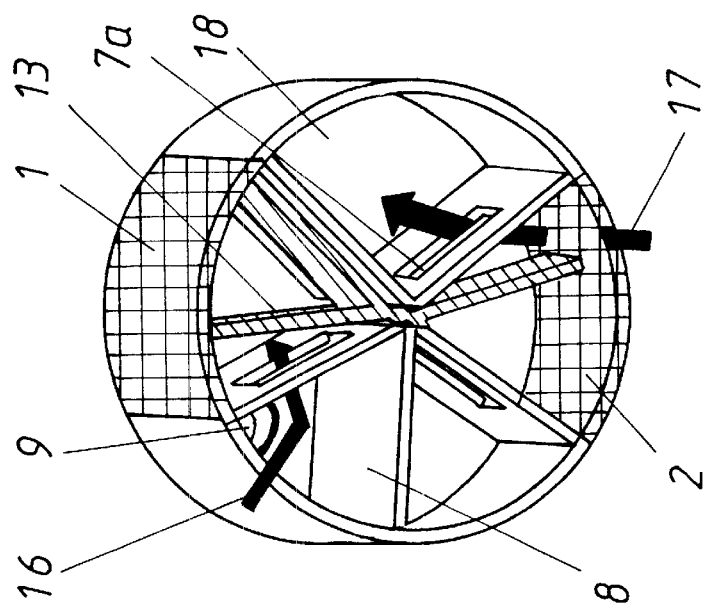
FIG. 4 shows schematically the flow paths in one particular position of the changeover device.
Figure 3:
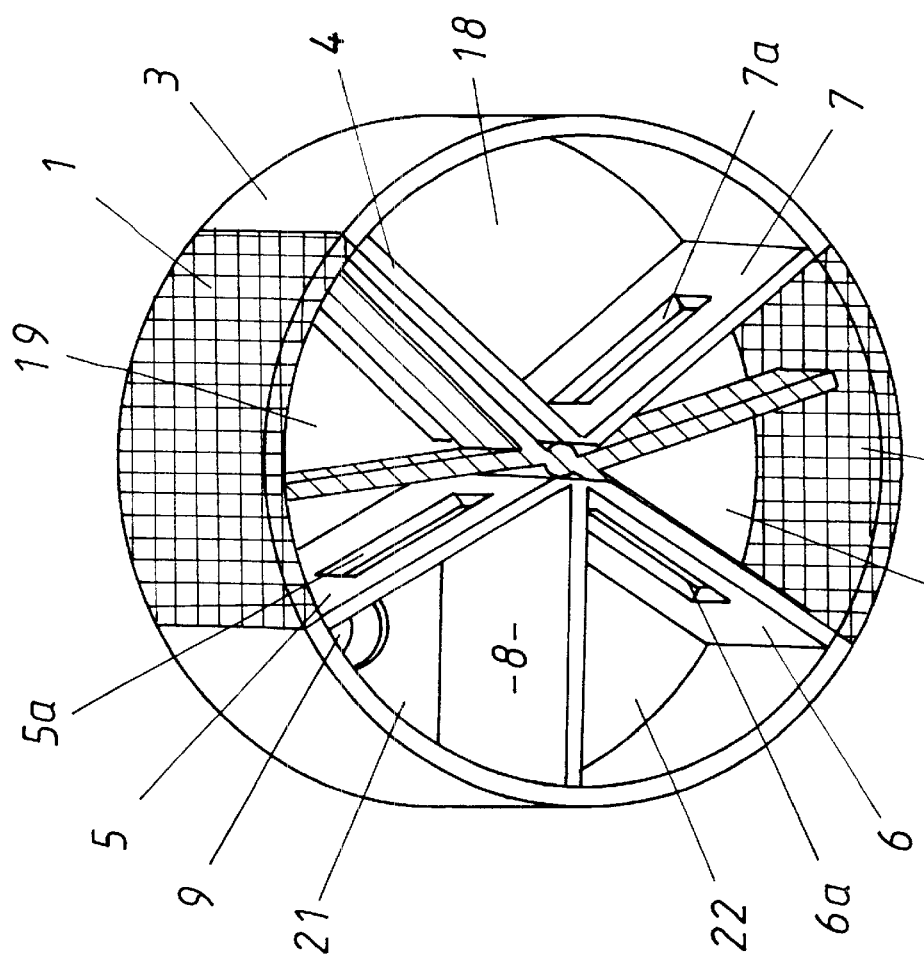
FIG. 3 is a perspective view from below of the arrangement according to FIG. 1

In FIGS. 1 to 4 a filter casing 3 is generally represented as a cylindrical part formed more or less as a tube and having two opposing filter surfaces 1, 2.

The filter casing 3 is divided into altogether five different chambers, namely the suction flow chamber 18 and compartments 19, 20, 21, 22 connecting thereto and disposed around the circumference.

Partitions 4, 5, 6, 7 are provided to divide the individual chambers 18–22 from one another, and openings 4a–7a are provided in the partitions 4–7.

The partition 8 is continuous i.e. there is no opening in it.

An inlet connection 9 over which an external valve shutter 11 can be placed in open or closed positions leads into the compartment 21.

In FIG. 2, the valve shutter 11 is shown in the open position, with a secondary airflow passing through this open valve shutter 11 and the inlet connection 9 in the direction of the arrow 16.

The inlet connection 10 on which an external valve shutter 12 rests leads into the compartment 22; in FIG. 2 the valve shutter 12 is shown in the closed position. It can be moved to its open position 12' indicated in broken lines.

A flap element 13 is pivotably arranged in the interior of the filter casing 3. It is pivotable in the direction indicated by the arrow 15 and back in the opposite direction.

The flap element consists of flipper paddles 13.1–13.4 joined together fixedly in rotation, and it is held so that it is able to turn freely about the rotational axis 14 between the partitions 4–7.

A radial clearance is preferably formed between the tip of each paddle 13.1 and 13.4 and the inner surface of the filter casing 3. The purpose of this clearance, defined as the expansion gap 23, 24, will be explained presently.

A radial outer clearance is likewise provided between the other paddles 13.2 and 13.3 and the inner circumference of the filter casing 3. The purpose of this clearance, which serves as the flow gap 25, 26, will be explained presently.

The working of the arrangement will now be described, the situation being presumed to be initially as follows:

Say the valve shutter 11 is open, as shown in FIG. 2. A secondary airflow 16 from the exterior is passing into the filter casing 3 via the inlet connection 9.

The paddle 13.1 of the flap element 13 is at present resting on the partition 5, so that the opening 5a is closed (i.e. in the position contrary to the one shown in FIG. 1).

Upon entering the opening 5a, this secondary airflow 16 impinges, as shown in FIG. 4, on the left-hand (i.e. initially the shutting) side of the paddle 13.1, thus moving the entire flap element 13 clockwise to the right, so that the paddle 13.1 is lifted off the opening 5a, as shown in FIG. 1.

At the same time, the airflow entering the chamber expands explosively inside the compartment 19a, and the secondary air flows through the expansion gap 24 into the adjoining compartment 19b, so that the flap element 13 is abruptly switched to the end position shown in FIG. 1.

The secondary air 16 then flows via the opening 5a and the expansion gap 24 towards the whole of the filter surface of the part-filter 1, from the inside outwards as the air in the whole of the compartment 19a, 19b expands through the expansion gap 24.

At the same time, the paddle 13.2 closes the opening 4a in the partition 4 and the paddle 13.4 closes the opening 6a in the partition 6, while the paddle 13.3 unblocks the opening 7a in the partition 7.

As a result, the suction airflow 17 is now able to pass through the filter 2 from outside, as shown in FIG. 4; it enters the chamber 20, and passes through the opening 7a into the suction flow chamber 18, from which it is carried off via an exhaust duct which is not shown. Hence the part-filter 2 is being used in normal suction mode, while part-filter 1 is impulsively dedusted and once cleaned stands ready for subsequent operation in suction mode.

When the valve shutters 11, 12 are moved to their other positions 11', 12', dedusting of the filter surface 2 proceeds in a similar fashion, as the suction airflow 17 passes through the filter surface 1.

The flap element 13 carries two approximately diametrically opposed paddles 13.2 and 13.4, one of which is closing one of the openings 4a, 6a at any one time. In a similar fashion, the paddles 13.1 and 13.3 close the openings 5a and 7a.

The secondary air emerging from the filter surface 1 and serving to clean the filter surface 1 can be led back into the suction flow 17 through the part-filter 2, causing the latter to be lightly charged with dust particles removed from the filter surface 1.

Most of the dust removed, however, will fall under the action of gravity to the bottom of the casing, from which it must periodically be emptied.

The continuous partition 8 between the compartments 21 and 22 also serves to cool the secondary airflow 16 entering the compartment 21 via the inlet connection 9. Here the secondary airflow comes into contact with the partition 8 in the direction of the cooler compartment 22 which is cooled by the colder suction airflow 17.

This cooling of the secondary airflow has the advantage that the vacuum cleaner turbine producing the airflows is cooled by the said secondary airflow as well as by the suction airflow. This ensures that the turbine casing and motor are adequately cooled even when many dedusting operations occur in succession.

Frequent dedusting of the filter-parts 1, 2 could be necessary e.g. to remove very fine dust in the micron range (sanding or grinding dusts).

DRAWING LEGEND

1. Filter surface
2. Filter surface

3. Filter casing
4. Partition 4a Opening
5. Partition 5a Opening
6. Partition 6a Opening
7. Partition 7a Opening
8. Partition
9. Inlet connection
10. Inlet connection
11. Valve shutter 11'
12. Valve shutter 12'
13. Flap element 13.1–13.4 Paddles
14. Rotational axis
15. Arrow
16. Secondary airflow
17. Suction airflow
18. Suction flow chamber
19. Compartment 19a, 19b
20. Compartment
21. Compartment
22. Compartment
23. Expansion gap
24. Expansion gap
25. Flow gap
26. Flow gap

What is claimed is:

1. A filter dedusting arrangement in a vacuum cleaner, wherein dedusting of the filter is effected by supplying a secondary airflow, comprising:

a casing having one or more openings for directing secondary airflow to the filter; and a flap element movably arranged in said casing to selectively open or close said one or more openings;

said flap element positioned in relation to said one or more openings and the filter such that control of the secondary airflow through the filter for dedusting causes differences in pressure between the partial vacuum of the suction airflow and at least one of atmospheric pressure and a separately generated positive pressure, said differences in pressure causing said flap element to abruptly change its position and open or close said one or more openings in said casing so that the secondary airflow impinges impulsively on a surface of the filter to be dedusted.

2. The filter dedusting arrangement according to claim 1, wherein said casing includes partitions dividing said casing into several chambers, said partitions including said one or more openings, at least two of said chambers each having a respective filter assigned to it.

3. The filter dedusting arrangement according to claim 1, wherein said flap element is formed as a rotary vane with several paddles.

4. The filter dedusting arrangement according to claim 1, wherein said flap element comprises two adjacent paddles.

5. The filter dedusting arrangement according to claim 1, comprising a switching part of said flap element located spatially separately from the filter or connected to the filter by said casing.

6. The filter dedusting arrangement according to claim 1, wherein said flap element is not directly driven, but operates passively.

7. The filter dedusting arrangement according to claim 2, wherein secondary air in the form of at least one of ambient air and air under pressure is supplied via one or more valve devices to at least one of said chambers and portions of said flap element, said portions being abruptly set in motion about a rotation axis and pivoted from a first end position into a second end position where said portions close a corresponding outlet-opening so that the secondary air admitted into said at least one of said chambers impinges on the associated filter and supplies it with an impulsively formed airflow.

8. The filter dedusting arrangement according to claim 4, wherein said flap element comprises further paddles which serve to switch the suction airflow from the filter surface which is about to be dedusted to another, freshly dedusted, filter surface.

9. The filter dedusting arrangement according to claim 1, wherein said flap element is switched alternately back and forth.

10. The filter dedusting arrangement according to claim 1, wherein said flap element is changed over by the admission of extraneous air through one of a number of inlet connections on said casing, valve shutters being provided which can be shifted into closed or open positions by electric motor or electromagnet.

11. The filter dedusting arrangement according to claim 1, wherein selection of the secondary airflow to dedust the filter surface by directing the airflow onto it is controlled electronically by means of sensors.

12. The filter dedusting arrangement according to claim 11, wherein said sensors detect the amount of soiling of the filter surfaces.

13. The filter dedusting arrangement according to claim 1, wherein dedusting is initiated manually.

14. The filter dedusting arrangement according to claim 1, wherein filter surfaces are connected to said casing by corresponding passageways.

15. The filter dedusting arrangement according to claim 1, wherein the filter is relatively elongated in form, and the flap element is arranged in the upper region of the filter, while the whole of the lower region of the filter is formed by corresponding filter surfaces.

16. The filter dedusting arrangement according to claim 1, wherein one or more flat filters are used as filter elements.

* * * * *

UNITED STATES PATENT AND TRADEMARK OFFICE
CERTIFICATE OF CORRECTION

PATENT NO.    : 6,458,178 B1
DATED         : October 1, 2002
INVENTOR(S)   : Klaus Dietz, Silke Meyer and Günther Werbach It is certified that error appears in the above-identified patent and that said Letters Patent is hereby corrected as shown below:

<u>Title page,</u>
Item [73], change Assignee to read -- WAP Reinigungssysteme GmbH & Co. --

Signed and Sealed this

Eleventh Day of March, 2003

JAMES E. ROGAN
*Director of the United States Patent and Trademark Office*